(12) United States Patent
Vinayachandran et al.

(10) Patent No.: US 12,580,652 B2
(45) Date of Patent: Mar. 17, 2026

(54) SIGNAL PROCESSING SYSTEM, A DE-NOISING METHOD, AND A NON-TRANSITORY COMPUTER READABLE MEDIUM STORING A DE-NOISING PROGRAM

(71) Applicant: NEC Corporation, Tokyo (JP)

(72) Inventors: Ankith Vinayachandran, Tokyo (JP); Shinsuke Fujisawa, Tokyo (JP); Naoto Ishii, Tokyo (JP); Emmanuel Le Taillandier de Gabory, Tokyo (JP)

(73) Assignee: NEC CORPORATION, Tokyo (JP)

( * ) Notice: Subject to any disclaimer, the term of this patent is extended or adjusted under 35 U.S.C. 154(b) by 183 days.

(21) Appl. No.: 18/118,463

(22) Filed: Mar. 7, 2023

(65) Prior Publication Data

US 2023/0388015 A1 Nov. 30, 2023

(30) Foreign Application Priority Data

May 30, 2022 (JP) ................................. 2022-087731

(51) Int. Cl.
H04B 10/2507 (2013.01)
H04B 10/69 (2013.01)

(52) U.S. Cl.
CPC ....... H04B 10/2507 (2013.01); H04B 10/697 (2013.01)

(58) Field of Classification Search
None
See application file for complete search history.

(56) References Cited

U.S. PATENT DOCUMENTS

| | | | | | |
|---|---|---|---|---|---|
| 6,128,111 | A | * | 10/2000 | Roberts | H04B 10/2563 |
| | | | | | 398/1 |
| 7,155,132 | B2 | * | 12/2006 | Chiappetta | H04B 10/504 |
| | | | | | 398/115 |
| 7,756,421 | B2 | * | 7/2010 | Roberts | H04B 10/2543 |
| | | | | | 398/158 |
| 8,909,061 | B1 | * | 12/2014 | Varadarajan | H04B 10/6161 |
| | | | | | 398/210 |
| 10,348,364 | B2 | * | 7/2019 | Giraldo | H03F 1/3294 |
| 10,708,094 | B2 | * | 7/2020 | Yaman | H04L 25/03165 |
| 11,831,347 | B2 | * | 11/2023 | Tanio | G06N 3/082 |
| 12,088,349 | B2 | * | 9/2024 | Dmitry | H04L 25/03343 |

(Continued)

FOREIGN PATENT DOCUMENTS

EP 3399710 A1 11/2018

OTHER PUBLICATIONS

Malla Reddy College of Engineering & Technology, Machine Learning Lecture Notes, 2021 (Year: 2021).*

(Continued)

*Primary Examiner* — Jai M Lee
(74) *Attorney, Agent, or Firm* — Sughrue Mion, PLLC

(57) ABSTRACT

This disclosure relates to a signal processing system for an optical communication system including an optical transmitter and an optical receiver. The signal processing system is configured to: identify a distortion of input signals from an optical receiver in an unsupervised manner to output distortion parameters indicating the distortion identified; and utilize the outputted distortion parameters to modify signal inputted to an optical transmitter.

13 Claims, 12 Drawing Sheets

(56) References Cited

U.S. PATENT DOCUMENTS

2009/0028578 A1 * 1/2009 Sun ........................ H04B 10/58
398/193

OTHER PUBLICATIONS

Medhi, Von Neumann Architecture, 2012 (Year: 2012).*
Song et al., Over-the-fiber Digital Predistortion Using Reinforcement Learning, IEEE, 2021 (Year: 2021).*
Koike-Akino et al., Neural Turbo Equalization: Deep Learning for Fiber-Optic Nonlinearity Compensation, 2020 (Year: 2020).*
G. Paryanti, H. Faig, L. Rokach and D. Sadot, "A Direct Learning Approach for Neural Network Based Pre-Distortion for Coherent Nonlinear Optical Transmitter," in Journal of Lightwave Technology, vol. 38, No. 15, Aug. 1, 2020, doi: 10.1109/JLT.2020.2983229 (Abstract).

* cited by examiner

200

202                              201
Signal Trim                 Distortion Idenfy
means                            means 203                    202                    201

Compensation        Signal Trim        Distortion Idenfy
means                   means                    means QPSK Constellation Extract the distribution statistical information from signal.

Modify the signal characteristics by modifying the signal statistics.
($d_i$ to $d_i'$)

Algorithm for Pre-compensation learning

1: Connect Tx & Rx in b2b setup
2: Obtain [Input,Output] from the setup
3: Obtain $m_i, u_i$ from UCA(Output).
4: Initialize $T_i$
5: while $Loss_i < Loss_{i-1}$ do
6:    Set $T_i$
7:    $Output_i = f(Output, m_i, u_i, T_i)$.
8:    Train DPD using $[Input, Output_i]$.
9:    Evaluate $Loss_i$ of DPD.
10: end while
11: return $DPD$

SIGNAL PROCESSING SYSTEM, A DE-NOISING METHOD, AND A NON-TRANSITORY COMPUTER READABLE MEDIUM STORING A DE-NOISING PROGRAM

INCORPORATION BY REFERENCE

This application is based upon and claims the benefit of priority from Japanese patent application No. 2022-087731, filed on May 30, 2022, the disclosure of which is incorporated herein in its entirety by reference.

BACKGROUND

The present disclosure relates to a signal processing system, a de-noising method, and a non-transitory computer readable medium storing a de-noising program for compensation of distortion, in particular a compensation of distortion in optical communication.

An example of a conventional distortion compensation system is disclosed in U.S. Pat. No. 7,756,421B2, "Electrical domain compensation of non-linear effects in an optical communications system". As illustrated in FIG. 1, an optical communication system denoted by 100 includes an optical transmitter 101, an optical receiver 102 and a pre-compensation means 103. The optical transmitter 101 includes a DAC (Digital to Analog Convertor) 101a and transmit means 101b. The transmit signal inputted to the optical transmitter 101 is through various sub devices such as DAC 101a which converts the input signal in digital form into analog form for transmission. The transmit means 101b may include a driving amplifier, Mach Zehnder modulator which are indicated in 101b.

When the optical receiver 102 receives an optical transmit signal from the optical transmitter 101, the receive means 102a recovers the optical signal by using an optical recovery method such as coherent recovery. The recovered optical signal is then provided to Analog to Digital Convertor 102b. The ADC 102b converts the analog optical signal to a digital signal. The DSP (Digital Signal Processing) 102c processes digital signal. The DSP 102c includes various signal processing operations such as synchronization and filtering.

The process in the optical transmitter 101 is not ideal and thus induces distortion which are not desirable. These distortions impact the transmission performance, and therefore need to be compensated adequately. The pre-compensation means 103 is utilized to add pre-compensated component to the input.

The conventional system having such a structure operates as follows. Initially the input signal which consist of the encoded message to be transmitted is given to the DAC 101a of the optical transmitter 101. This analog input is then converted to an optical signal and sent to the optical receiver 102. The optical signal at the receiver 102 is recovered by the means 102a. The input to the optical transmitter 101 and output from the receiver 102 are utilized to learn a pre-compensation function in the pre-compensation means 103. This may be achieved by utilizing various function learning methods on the input and output data such as filter coefficient learning, memory polynomial and neural networks. This may be as depicted in Non-Patent Literature, G. Paryanti, H. Faig, L. Rokach and D. Sadot, "A Direct Learning Approach for Neural Network Based Pre-Distortion for Coherent Nonlinear Optical Transmitter," in Journal of Lightwave Technology, vol. 38, no. 15, pp. 3883-3896, 1 Aug. 1, 2020, doi: 10.1109/JLT. 2020.2983229, where neural network based function learning is described. As described in FIG. 1, the pre-compensation means 103 comprising the compensation function learnt by using the input and output data may be implemented before the optical transmitter 101 in the implementation phase.

The above-described method can also be implemented as a post compensation scenario where the compensation function is implemented after the optical receiver 102. In this scenario a compensation means is implemented after the optical receiver 102 and not before the optical transmitter 101.

SUMMARY

A first problem is distortion compensation function inaccurately learning from collected signal data. The reason for the occurrence of the first problem is that parts of the distortion components of the distortion are non-deterministic in nature and hence not learnable. In other words, some parts of the distortion may be noise or other elements which follow a distribution making it non-deterministic and therefore they are not learnable.

A second problem is that the learnt distortion compensation function is suitable only for the operating environment in which signal data is collected. The reason for the occurrence of the second problem is the function learning might have inaccurately learnt to compensate for operation condition noise profile which is likely to change when the operating condition is changed. Operating condition noise profile refers to the properties of system such as SNR and other noise characteristics. As input power or any other system condition is varied, this noise profile is bound to change and therefore the compensation function may also need to be changed.

A third problem is that large amount of data is required to accurately learn the distortion compensation function. The reason for the occurrence of the third problem is that large amount of data is needed to eliminate non-deterministic effects and learn an accurate distortion compensation function for the deterministic effects.

An objective of this disclosure is to provide a signal processing system, a de-noising method and a non-transitory computer readable medium storing a de-noising program capable of solving at least one of the above-described problems.

A signal processing system for an optical communication system including an optical transmitter and an optical receiver is proposed. The system is configured to:

identify a distortion of input signals from the optical receiver in an unsupervised manner to output distortion parameters indicating the distortion identified; and utilize the outputted distortion parameters to modify signal inputted to the optical transmitter with or without the assistance of the ground truth.

A de-noising method performed by a computer for an optical communication system including an optical transmitter and an optical receiver is proposed. The method includes:

identifying a distortion of input signals from the optical receiver in an unsupervised manner to output distortion parameters indicating the distortion identified; and utilizing the outputted distortion parameters to modify signal inputted to the optical transmitter with or without the assistance of the ground truth.

A non-transitory computer readable medium storing a de-noising program for an optical communication system including an optical transmitter and an optical receiver is proposed. The program causes a computer to execute:

identifying a distortion of input signals from the optical receiver in an unsupervised manner to output distortion parameters indicating the distortion identified; and utilizing the outputted distortion parameters to modify signal inputted to the optical transmitter with or without the assistance of the ground truth.

A first effect is to ensure that accurate learning of the distortion compensation function is possible. The reason for the first effect is that the de-noising means is able to eliminate or reduce the un-learnable or non-deterministic effect in the signal data.

A second effect is to ensure that the distortion characteristics are accurately learnt in a blind or unsupervised manner and used to learn the compensation profile. The reason for the second effect is that the distortion identify means is able to accurately identify the distortion characteristics from the provided unlabeled signal data.

A third effect is to ensure that the distortion characteristics learning data requirement is reduced. The reason for the effect is that the de-noising means eliminates un-learnable or non-deterministic components in the data so less data is required to infer the accurate distortion compensation function.

DESCRIPTION OF EMBODIMENTS

First Example Embodiment

<Explanation of Structure>

First, a first example embodiment is elaborated below referring to the accompanying drawings.

Figure 2:
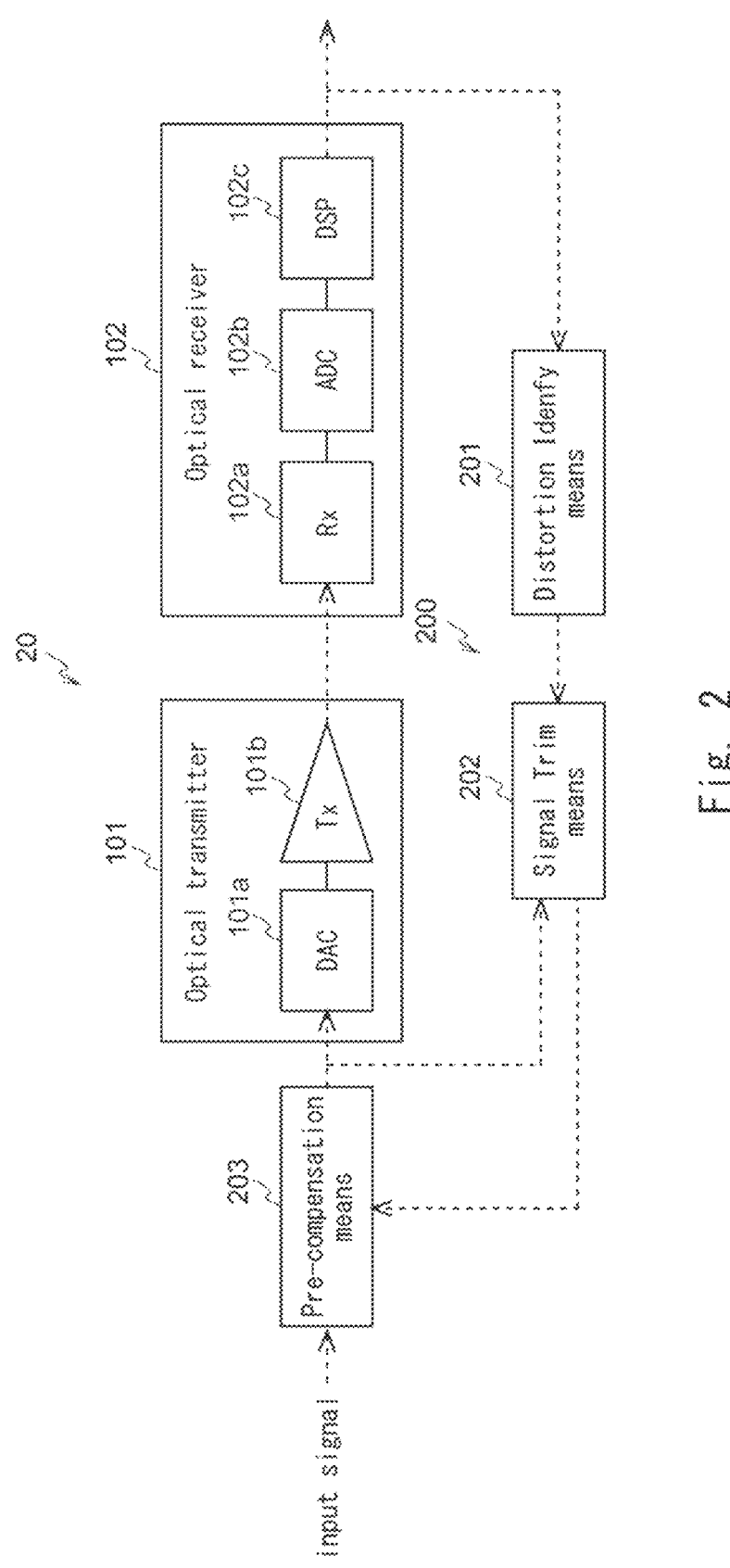
FIG. 2 is a diagram illustrating a first example embodiment with pre-compensation implemented along with our proposed method.

Referring to FIG. 2, an optical communication system 20 according to the first example embodiment is described. The optical communication system 20 includes a distortion identify means 201, a signal trim means 202 and a pre-compensation means 203. The distortion identify means 201 and the signal trim means 202 correspond to a de-noising system 200. These means 201 to 203 are embodied by at least a computer with at least a program. The computer may include various IC such as CPU (Central Processing Unit), processor, data processing device, FPGA (Field Programmable Gate Array), and ASIC (Application Specific Integrated Circuit).

These proposed means 201,202 may be included into the existing prior art setup of the system 100 including the optical transmitter 101, the optical receiver 102 and the pre-compensation means 103. The means 203 may be identical to the pre-compensation means 103 as in FIG. 1.

Those means generally operate as follows.

The means 201 includes a learning algorithm of the unsupervised class that learns parameters that enable it to characterize the signal statistical properties. The unsupervised class of learning algorithms aim to learn the objective from the signal without any label. The label in this case could be the actual transmit signal (i.e. ground truth). The objective is to learn blindly the signal characteristics such as means and variance for the symbols, i.e. without assistance of label/unsupervised. Specifically, for a k-th order signal constellation, a typical learning algorithm aims to learn parameters such as mean (i.e. center) and variance corresponding to each of the k unique transmit symbols. More parameters may also be learnt to characterize the signal by this means 201. A variety of unsupervised learning algorithms may be adopted. For example, the learning algorithm could be a Gaussian mixture model (GMM) that aim to learn the signal characteristics under the assumption that signal characteristics properties belong to the Gaussian distribution class. According to the system operating condition, the distribution being assumed to learn the parameters can be adjusted. In other words, an appropriate mixture model as the unsupervised learning algorithm may be adopted depending on a distribution the noise may belong to.

The means 202 utilizes the parameters learnt from the means 201, which are then used in order to modify the signal. This modification may be undertaken by using properties associated with the distribution along with the learned parameters identified from the previous means 201. The identification of the distribution to which the distorted signal most appropriately corresponds to is a critical step achieved by the means 201 and facilitates the further modification of the signal in the means 202. One of such properties is the "confidence interval" of the distribution that indicates the likelihood that a signal point corresponds to a particular symbol from among the k input symbols. This modification may be done using the ground truth about the actual signal using a confidence interval threshold "T" as follows.

<Equation 1>

$$\bar{y} = (y, T, w, x) \tag{1}$$

Where f( ) is the signal modifying function which is dependent on the input from the means 201 (i.e. y), the confidence interval T, the parameters learned from the means 201 as "w" and the ground truth as "x".

The means 202 may also modify the signal without the ground truth as follows.

<Equation 2>

$$\bar{y}=f(y,T,w) \qquad (2)$$

The de-noise is implemented by the means 201 and 202 at the equation 1 and 2.

The selection of operation of the means 202 can be 2 modes: a first mode with ground truth and a second mode without ground truth. In the first mode with ground truth, the means 202 uses the actual signal ground truth to set the signal modification/trimming. The second mode may be used in scenarios where the actual signal ground truth is difficult to obtain or unavailable. In the second mode without ground truth, the means 202 uses the likelihood estimation for each symbol from the means 201 to form a "pseudo ground truth". And the means 202 uses the "pseudo ground truth" to set the signal modification/trimming.

The output from the means 202 is provided to the pre-compensation means 203. The pre-compensation means 203 corresponds to a compensation means to compensate a distortion of at least one input signal.

Those means 201 and 202 mutually operate in such a way that de-noise the data from the optical receiver 102 to achieve the performance improvement for the system 200 especially by improving the data to the means 203.

<Description of Operation>

Figure 3:
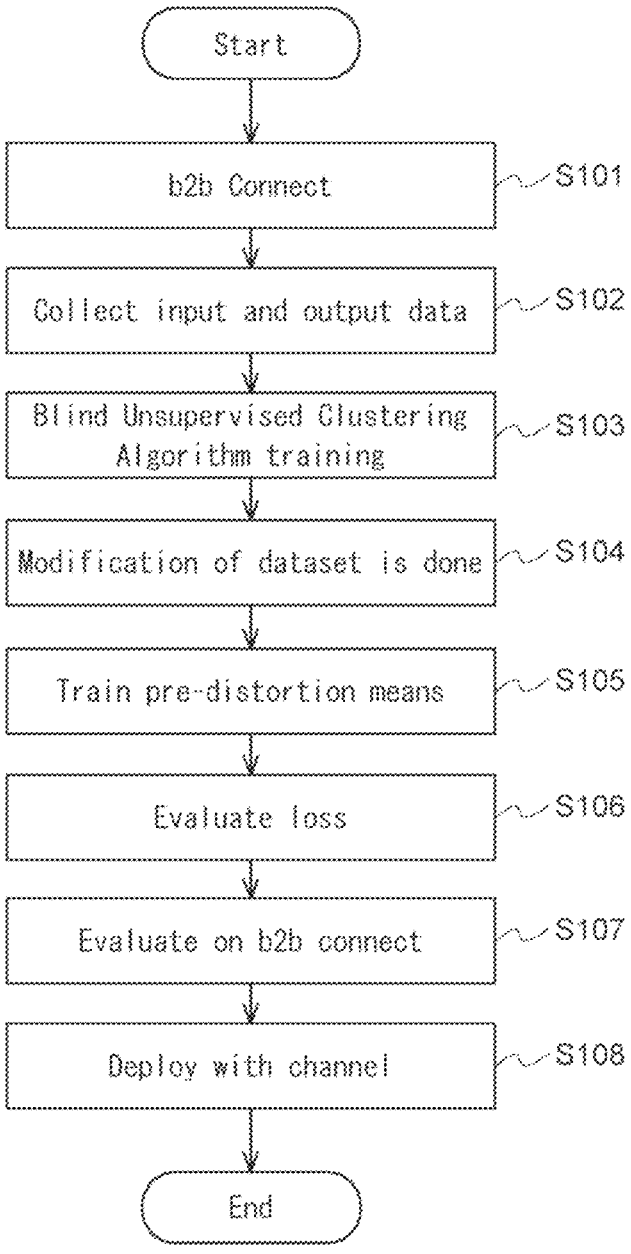
FIG. 3 is a flow diagram illustrating the flow of the operation of the first example embodiment.

Next, referring to flowcharts in FIG. 3, the general operation of the first example embodiment is elaborated.

First, in step S101 in FIG. 3, back to back (b2b) connect is established, that is optical setup is run without any compensation in a back to back setup with the optical transmitter 101 and the optical receiver 102 connected. In this setup, the input transmit symbols are passed through the optical transmitter 101 and the optical receiver 102 and then received symbol which is the output from the optical receiver 102 is collected by the means 201. The input transmit pattern consists of the message to be transmitted encoded with appropriate constellation symbols. This input signal gets converted to electrical form then to optical form and then finally back to electrical form in the optical receiver 102 which is converted back to the digital form at the output of the optical receiver 102. Then, in step S102 both the input signal to the optical transmitter 101 and output signal from the optical receiver 102 are collected. The output signal to the optical receiver 102 is utilized by the means 201. The input signal to the optical transmitter 101 may be utilized by the means 202 and the means 203. The means 202 may or may not utilize the input signal depending on whether signal trimming is supervised or unsupervised.

Further, in step S103, Blind Unsupervised Clustering Algorithm training is done, that is the means 201 which may implement an Unsupervised Clustering Algorithm as described before as unsupervised learning algorithm is run on the collected received signal output data in step S102. The means 201 learns the characteristics of the received constellation with the objective of classifying the received signals as the original ground truth symbol. Generally, an Unsupervised learning algorithm as described in the means 201 aims to classify (i.e. cluster) the signals. We repurpose this algorithm to just extract the parameters that are used to classify the signals. The extracted parameters are passed to the means 202.

In step S104, modification of dataset (i.e. signals) for confidence region Ti is done. In this step, the output and learned parameters from the means 201 are is passed on to the means 202 in order to de-noise and modify the signal. This step involves utilizing the parameters from the means 201 as described in the Explanation of structure section in order to generate the output for the means 202. This output is modified signals.

In step S105, training of the means 203 is done. In this step, this modified signal is passed onto the means 203 where training is done along with the ground truth. The means 203 may use the ground truth available from the optical transmitter 101.

After convergence of training evaluation of loss from the ground truth is done in step S106 by a loss function. The evaluation of loss from the ground truth is an automated process such as in neural network training. The evaluation of loss from the ground truth is to evaluate the fit/accuracy of the pre-compensation means 203. The evaluation criteria may be a loss function such as "mean square error loss". This loss is evaluated by comparing the learnt compensation output with the expected ideal value generated from the available ground truth. This loss evaluation methodology may change depending on the implementation of the structure of the means 203 such as filter, memory polynomial or Artificial Neural Network. Output from the loss function is used to modify the weights function using iterative algorithms such as back propagation to ensure convergence and minimal loss.

In step S107, evaluation of back to back (b2b) connect is done by a simple evaluation using loss function or computing BER (Bit Error Ratio). This process may be manual or automated with well-defined functions. In this step, the means 203 is implemented first in the b2b setup. In step S107, the performance of the complete system is evaluated. That is, the optical transmitter 101 is connected to the optical receiver 102 setup in the back to back arrangement and evaluation is done with and without the presence of the pre-distortion function. This step is done to validate the performance improvement achieved due to the mitigation of distortions by the means 203.

In step S108, in presence of the optical channel which is connected in between the optical transmitter 101 and the optical receiver 102 deployment with the channel is done. In other words, the optical fiber is connected between the optical transmitter 101 and the optical receiver 102. This deployment can be done manually or automatically. The b2b setup is utilized during the initial steps so that distortions induced by the optical transmitter 101 are only present in the signal data used for learning the distortion mitigation strategy. However, an online communication system may include at least a channel such as an optical fiber cable placed between the optical transmitter 101 and the optical receiver 102. Therefore, in the deployment stage, learnt compensation function is implemented in an optical communication system with optical fiber.

Figure 4:
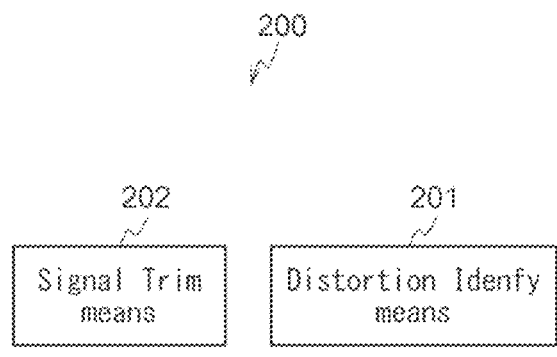
FIG. 4 describes main components of a de-noising system.

FIG. 4 describes main components of the de-noising system 200 for an optical communication system including the optical transmitter 101 and the optical receiver 102. The de-noising system 200 includes the distortion identify means 201 and the signal trim means 202.

As described above, the distortion identify means 201 identifies a distortion of input signals from the optical receiver 102 in an unsupervised manner to output distortion parameters indicating the distortion identified. The signal trim means 202 utilizes the outputted distortion parameters to modify signal inputted to the optical transmitter 101 with or without the assistance of the ground truth with the objective of denoising the signal. The modified signal is used for a distortion function compensating distortions of signals used in the optical communication system to learn along with the ground truth. Therefore, distortions induced the optical transmitter 101 are mitigated.

Further, the distortion identify means 201 is configured to learn the distortion parameters by learning statistical information for probability distributions of the distortion identified.

Further, the distortion identify means 201 is configured to learn the statistical information with learning algorithms.

Further, the distortion identify means 201 is configured to cluster and separate the input signal according to at least one transmit symbol of the input signal.

Further, the signal trim means 202 is configured to modify the signal based on statistical properties of the signal, the statistical properties include likelihood of the signal.

Figure 5:
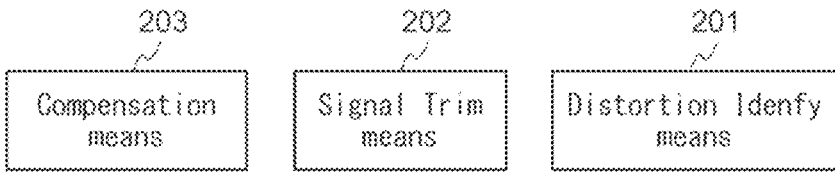
FIG. 5 describes main components of a signal processing system.

FIG. 5 describes main components of a signal processing system for an optical communication system including the optical transmitter 101 and the optical receiver 102. The signal processing system includes the distortion identify means 201 and the signal trim means 202, and the compensation means 203.

As described above, the compensation means 203 utilizes the modified signal along with the ground truth to learn a function to compensate distortions of at least one signal inputted to the compensation means 203. Therefore, distortions induced the optical transmitter 101 are mitigated.

Further, the function of the compensation means 203 compensates a distortion of at least one signal inputted to the optical transmitter.

<Description of Effect>

Figure 12:
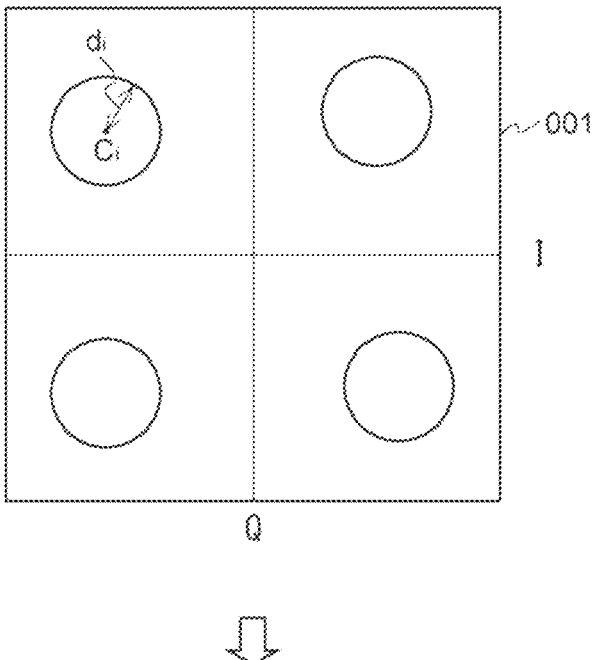
FIG. 12 is a diagram indicating the functioning of our proposed means for a QPSK constellation.
Figure 12:
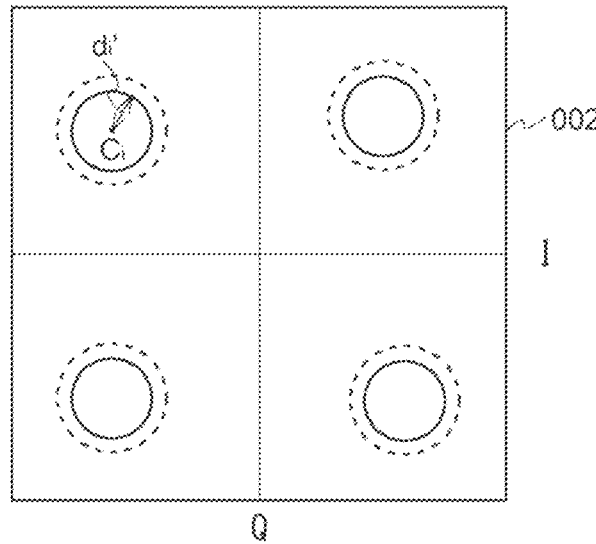

Next, the effect of the first example embodiment is described with aid from FIG. 12. FIG. 12 illustrates an ideal QPSK constellation of de-noising system according to this disclosure. In FIG. 12, the character d refers to the variance associated with the distribution for the labeled symbol before the signal trimming means. The character d' refers to the variance associated with the distribution for the symbols after application of the signal trim means.

The constellation 001 indicates a constellation after extraction of the distribution statistical information from signal. The constellation 002 indicates a constellation after modification of the signal characteristics by modifying the signal statistics.

As the first example embodiment is configured in such a manner that distortion characteristics is learned by the algorithm in the means 201 as indicated in 001 in FIG. 12, it is possible to learn the distortion characteristics as learnable parameters.

In addition, the example embodiment is configured in such a manner that the component of the distortion can be trimmed according to the distribution identified by the means 202 and some fixed confidence threshold related to the likelihood function as in 002 in FIG. 12, which enables the pre-compensation means 203 to be more accurate in modelling and require less data to converge to an accurate pre-distortion profile. Note that this de-noising occurs for all the symbols in FIG. 12, that is all symbols in FIG. 12 will be demolished.

Second Example Embodiment

<Explanation of Structure>

Next, a second example embodiment is elaborated below referring to the accompanying drawings.

Figure 6:
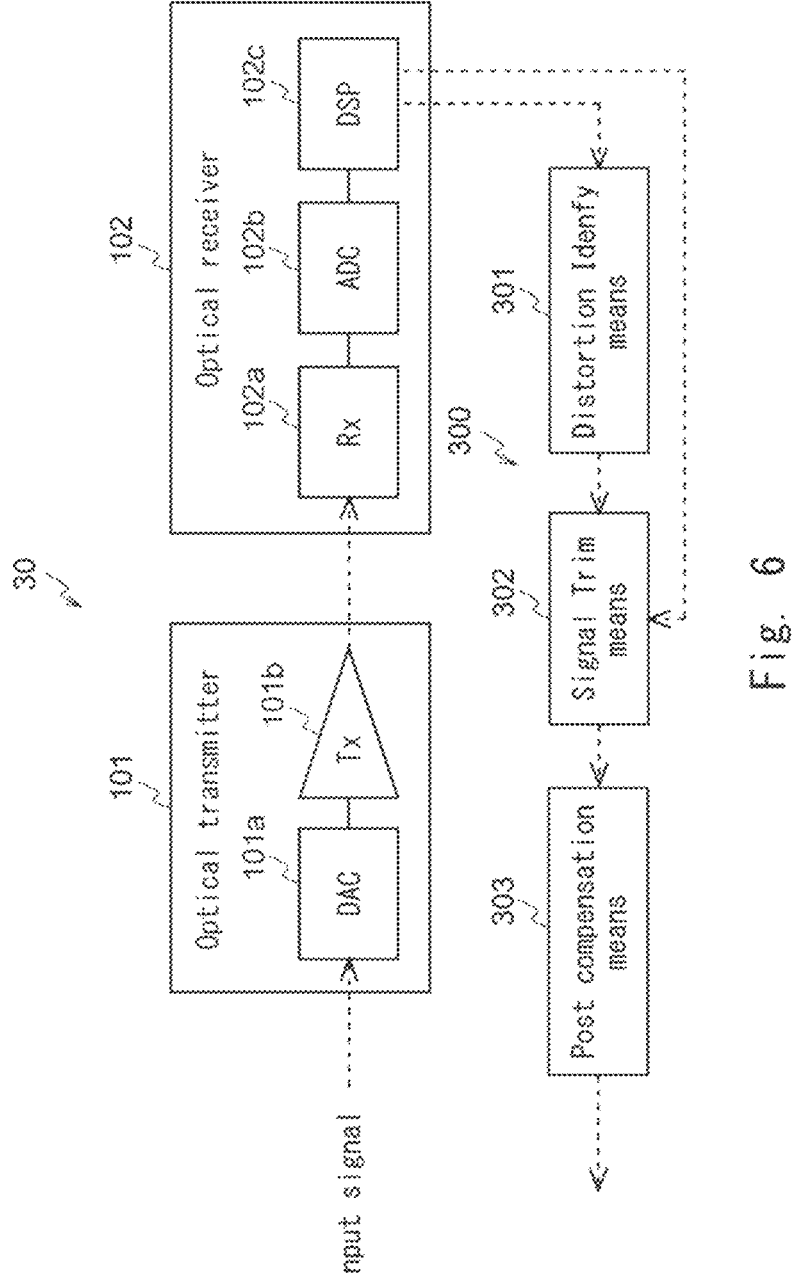
FIG. 6 is a diagram illustrating a second example embodiment with post compensation implemented along with our proposed method.

Referring to FIG. 6, an optical communication system 30 according to the second example embodiment is described.

The optical communication system 30 includes a distortion identify means 301, a signal trim means 302 and a post compensation means 303. The distortion identify means 301 and the signal trim means 302 correspond to a de-noising system 300. These means 301 to 303 are embodied by at least a computer with at least a program. The computer may include various IC such as CPU, processor, data processing device, FPGA, and ASIC.

The second example embodiment aims to showcase how the proposed de-noising system 300 is implemented in a post compensation scenario where a compensation block is placed after the optical receiver 102.

The proposed means are included into the existing prior art setup 100 that includes the optical transmitter 101, the optical receiver 102. Instead of a pre-compensation means 203, we look at a post compensation scheme with a post compensation means 303. The post compensation means 303 corresponds to a compensation means to compensate a distortion of at least one input signal.

Figure 1:
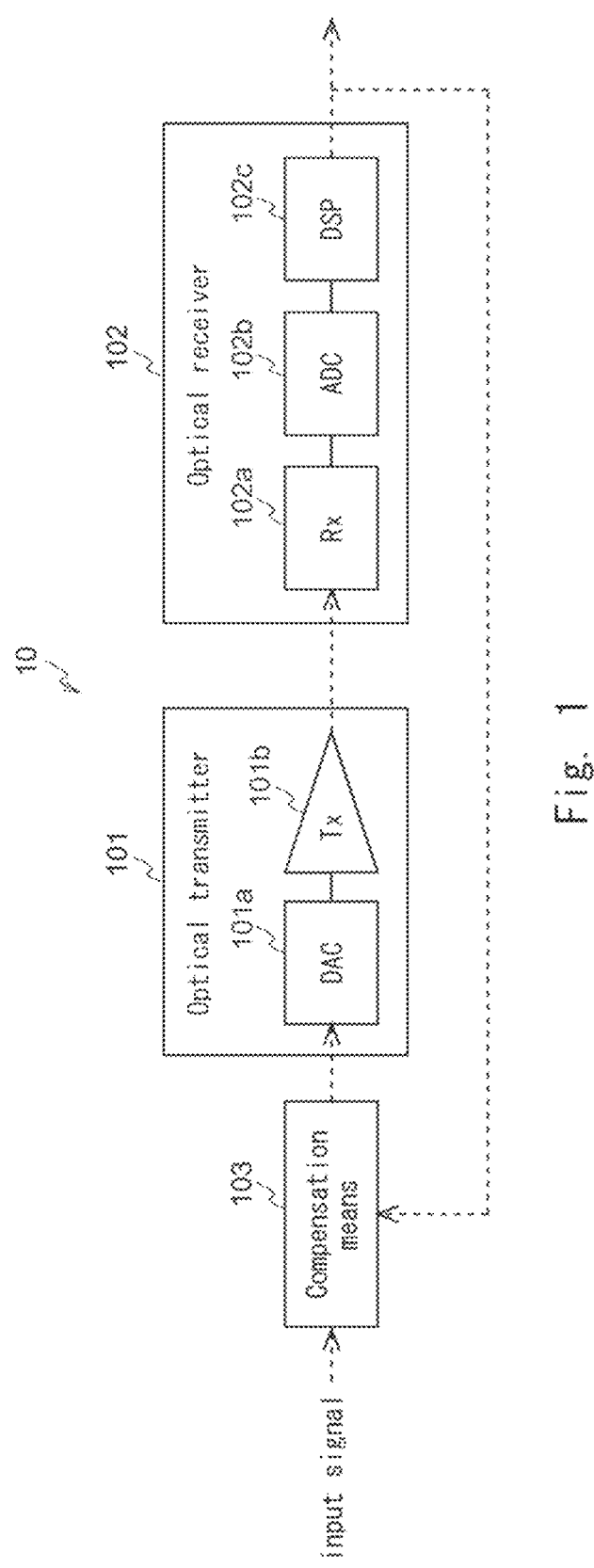
FIG. 1 is a block diagram illustrating the structure of the prior art: an optical communication system with a pre-compensation.

Note that the post compensation means may indicate a variation from the prior art in FIG. 1 but this does not represent a novelty. Post compensation is a fairly well-known technique for optical system effect compensation. The means 301 and 302 implemented before the means 303 indicate the implementation of the proposal in this embodiment.

The means 303 is similar to the means 103 and may be operated using Neural networks, filters, memory polynomial and other techniques which aim to infer the desired function from the available data.

Those means generally operate as follows.

The means 301 consists a learning algorithm of the unsupervised class that learns parameters that enable it to characterize the signal statistical properties. The unsupervised class of learning algorithms aim to learn the objective from the signal without any label. The label in this case could be the actual transmit signal (i.e. ground truth). For a K-th order signal constellation, a typical learning algorithm aims to learn parameters such as mean (i.e. center) and variance corresponding to each of the k unique transmit symbols. More parameters may also be learnt to characterize the signal by this means 301. The learning algorithm could be a Gaussian mixture model (GMM) that aim to learn the signal characteristics under the assumption that signal characteristics properties belong to the Gaussian distribution class. According to the system operating condition, the distribution being assumed to learn the parameters can be adjusted.

The means 302 utilizes the parameters learnt from the means 301 which are then used in order to modify the signal. This modification may be undertaken by using properties associated with the distribution along with the learned parameters. One of such properties is the "confidence interval" of the distribution that indicates the likelihood that a signal point corresponds to a particular symbol from among the k input symbols. This modification may be done using the ground truth about the actual signal using a confidence interval threshold "T" as follows.

<Equation 3>

$$\bar{y} = f(y, T, w, x) \qquad (3)$$

Where f( ) is the signal modifying function which is dependent on the input from the means 301 (i.e. y), the confidence interval T, the parameters learned from the means 301 as "w" and the ground Truth as "x".

The means 302 may also be utilized without the ground truth as follows.

<Equation 4>

$$\bar{y}=f(y,T,w) \tag{4}$$

The output from the means 302 is provided to the means 303.

In an alternative implementation, the means 301, 302, 303 may be utilized jointly to learn the most optimal settings to compensate the optical distortions in a post compensation manner. For a neural network based means 303, this joint learning may be implemented by a multi-loss objective function which involves the output and parameters from the means 301 and 302. Multi-loss objective function corresponds to scenario where weighted combination of more than one loss function is used in training a neural network. A possible combination of two loss functions could be mean square error and the likelihood function for the ground truth symbol. The likelihood function would derive parameters from the means 301 and 302 in this scenario. This could be implemented as follows.

<Equation 5>

$$\text{Loss function}=l_1\cdot(\bar{y}-x)^2+l_2\cdot g(\text{likelihood}(\bar{y})) \tag{5}$$

Where g( ) is a function to make the likelihood function suitable as a loss function to ensure convergence of training. 11, 12 are scalar weights used for the weighted combination of the loss functions.

Those means 301 and 302 mutually operate in such a way that de-noise the data from the optical receiver 102 to achieve the performance improvement for system 300 especially by improving the data to the means 303.

<Description of Operation>

Figure 7:
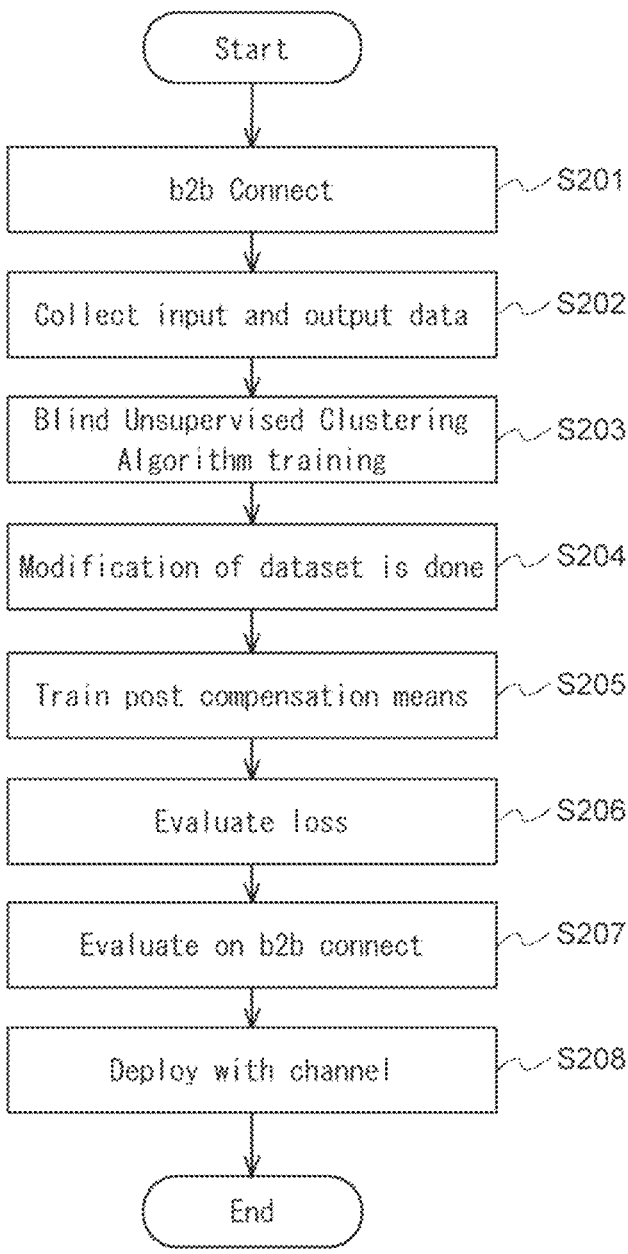
FIG. 7 is a flow diagram illustrating the flow of the operation of the second example embodiment.

Next, referring to flowcharts in FIG. 7, the general operation of the second example embodiment is elaborated.

First, in step S201 in FIG. 7, back to back (b2b) connect is established, that is optical setup is run without any compensation in a back to back setup. In this step, the input transmit symbols are passed through the optical transmitter 101 and the optical receiver 102 and received symbol is the output from the optical receiver 102. Then, in step S202 the output data is collected by the means 301.

Further, in step S203, Blind Unsupervised Clustering Algorithm training is done, that is the means 301 which may implement an Unsupervised Clustering Algorithm as described before as unsupervised learning algorithm is run on the collected output data in step S202.

In step S204, modification of dataset (i.e. signals) for confidence region Ti is done. In this step, learned parameters from the means 301 is utilized by means 302 in order to de-noise and modify the received signal output.

In step S205, training of the means 303 is done. In this step, this modified signal output from the means 302 is passed onto the post compensation means 303 where training is done along with the ground truth with an objective to retrieve the original signal from the modified signal. This objective is in contrast to the objective of learning the pre-compensation on the input of the means 203 in the first example embodiment. This training/fitting could utilize any of the known methods for learning post compensation using the dataset which contains the input symbol pattern and the modified signal pattern from the means 302.

After convergence of training evaluation of loss from the ground truth is done in step S206. In step S207, evaluation of back to back (b2b) connect is done. In this step, the means 303 is implemented first in the b2b setup.

In step S208, in presence of the optical channel which is connected in between the optical transmitter 101 and the optical receiver 102 deployment with the channel is done.

<Description of Effect>

Next, the effect of the second example embodiment is described with aid from FIG. 12.

As the second example embodiment is configured in such a manner that distortion characteristics is learned by the algorithm in the means 301 as indicated in 001 in FIG. 12, it is possible to learn the distortion characteristics as learnable parameters which include statistical information of the signal constellation.

In addition, the second example embodiment is configured in such a manner that the component of the distortion can be trimmed as in 002 in FIG. 12 according to the distribution identified by the means 302 using the learned information from the means 301 along with a fixed confidence parameter related to the likelihood, which enables the post compensation means 303 to be more accurate in modelling and require less data to converge.

Further, the function of the post compensation means 303 compensates a distortion of at least one signal outputted from the optical receiver.

Third Example Embodiment

<Explanation of Structure>

Figure 8:
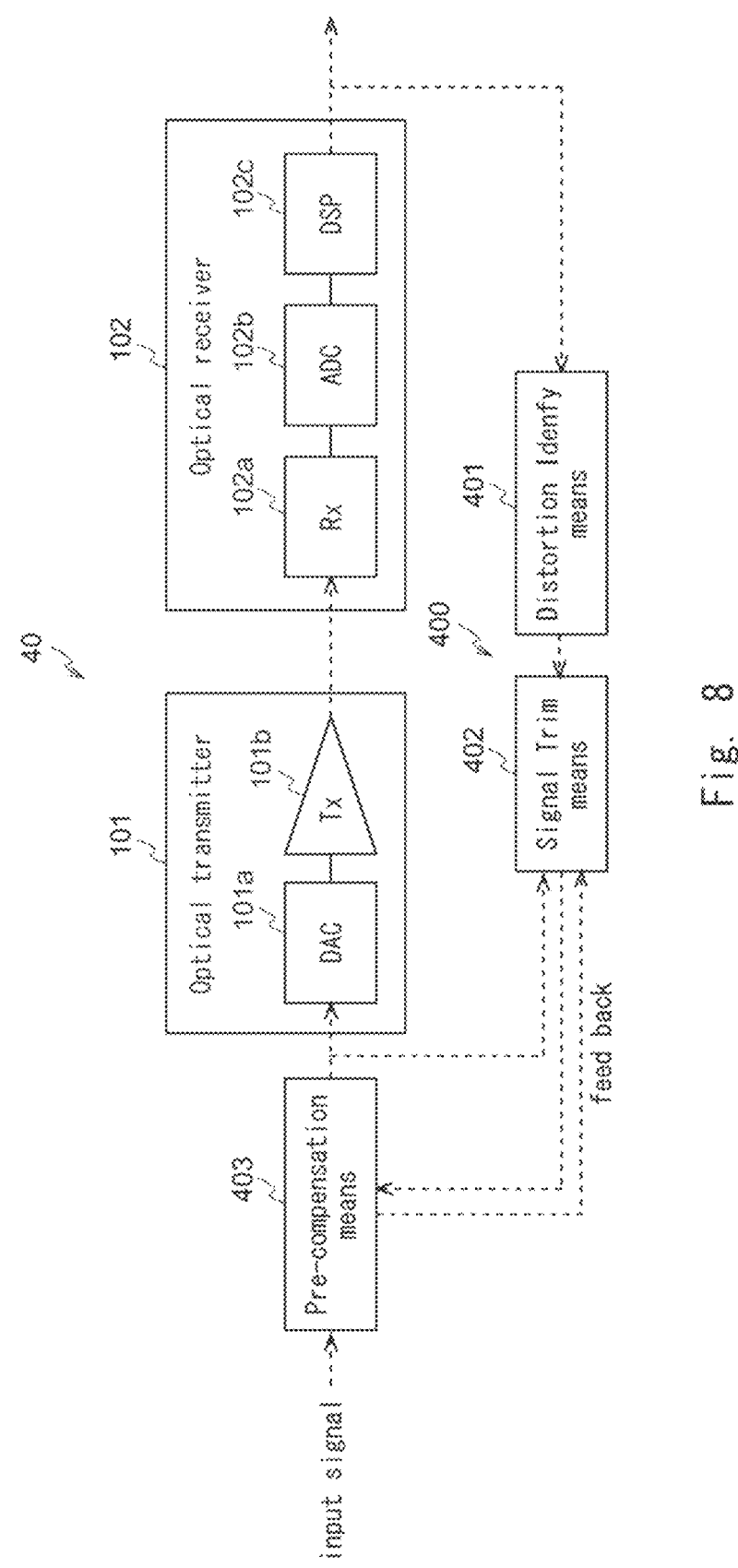
FIG. 8 is a diagram illustrating a third example embodiment with pre-distortion implemented along with our proposed method.

Next, a third example embodiment is elaborated referring to the accompanying drawings. Referring to FIG. 8, an optical communication system 40 according to the third example embodiment is described. The third example embodiment is identical to the first example embodiment in every respect except for a feedback from a pre-compensation means 403 to the means 402.

A distortion identify means 401 is identical to the means 201 of the first example embodiment while the signal trim means 402 is similar to means 202 with an additional input used to set the confidence interval "T". The distortion identify means 401 and the signal trim means 402 correspond to a de-noising system 400.

The means 403 is equivalent to the means 203 with an additional output to indicate the level or accuracy of fitting achieved from the input. The feedback may correspond to the loss function output from the means 403 which could be a loss function. The loss function output indicates the accuracy of the learnt function by comparing the output to the expected output based on the ground truth. This feedback is used to adjust parameters used by the means 402 such as confidence interval "T". This adjustment of the confidence interval "T" is done with an objective to feedback loss function value in the next iteration, that is the means 403 is trained with new output from the means 402. This ensures that output from the means 402 is also dependent on the previous state of the means 403.

<Description of Operation>

At least a program according to a third example embodiment is loaded onto at least a computer to control the operation of the computer. The computer may include various IC such as CPU (Central Processing Unit), processor, data processing device, FPGA (Field Programmable Gate Array), and ASIC (Application Specific Integrated Circuit). Under the control of the program, the computer performs the following processes, which are identical to those processes which are performed by the computers of the first example embodiment.

Figure 9:
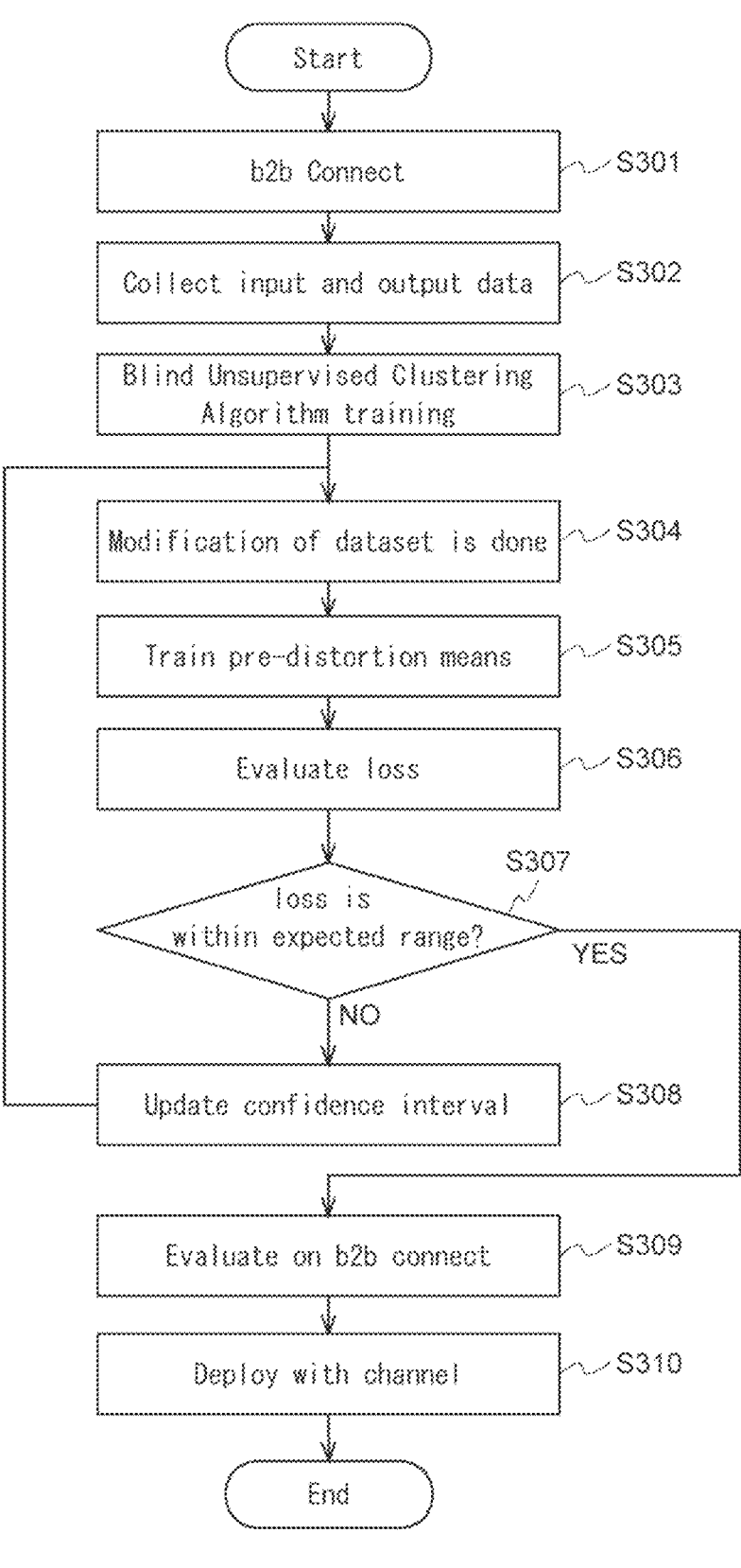
FIG. 9 is a flow diagram illustrating the flow of the operation of the third example embodiment.

Next, referring to flowcharts in FIG. 9, the general operation of the third example embodiment is elaborated.

First, in step S301 in FIG. 9, back to back (b2b) connect is established, that is optical setup is run without any compensation in a back to back setup. In this step, the input transmit symbols are passed through the optical transmitter 101 and the optical receiver 102 and received symbol is the output from the optical receiver 102. Then, in step S302 the output data is collected by the means 401.

Further, in step S303, Blind Unsupervised Clustering Algorithm training is done, that is the means 401 which may implement an Unsupervised Clustering Algorithm as described before as unsupervised learning algorithm is run on the collected output data in step S302.

In step S304, modification of dataset (i.e. signals) for confidence region Ti is done. In this step, learned parameters from the means 401 is utilized by the means 402 along with the received signal and the confidence parameter "T" in order to de-noise the signal.

In step S305, training of the means 403 is done. In this step, this modified signal is passed onto the means 403 where training is done along with the ground truth. After convergence of training the evaluation of loss from the ground truth is done in step S306.

Based on the loss from step S306, the next step is decided. In step S307, it is determined whether the loss is within the expected range. The step S307 may be done by a loss determining means in the de-noising system 400. The loss determining means can be embodied by at least a computer with at least a program. This expected range correspond to acceptable range of the loss. A loss function/accuracy metric is utilized to evaluate the loss. In case the selected loss function is "mean square error", loss evaluated would be compared to a preset loss threshold. If the evaluated loss is less than this preset value, the loss is determined to be within the expected range.

If the loss is not within the expected range (NO), then the confidence interval T used in the means 402 is updated based on feedback from the means 403 in step S308. The step S308 may be done by an update means in the de-noising system 400. The update means can be embodied by at least a computer with at least a program. In this process, the feedback from the compensation mechanism is a value such as the loss function output which gives an indication of the fit of the learned function to the ground truth. This estimate gives an indication of whether the signal trimming on the data done with a confidence interval is accurate. If the loss function value used as feedback is high, the confidence interval used is adjusted appropriately so that the new output from the signal trim means leads to a reduced loss function value or better fit. And this process returns to step S304.

In case the loss is within the expected range (YES), the process proceeds to step S309. In step S309, evaluation of back to back (b2b) connect is done. In this step, the means 403 is implemented first in the b2b setup.

In step S310, in presence of the optical channel which is connected in between the optical transmitter 101 and the optical receiver 102 deployment with the channel is done.

<Description of Effect>

Next, the effect of the third example embodiment is described with aid from FIG. 12 illustrating the effects on a QPSK signal constellation.

As the third example embodiment is configured in such a manner that distortion characteristics is learned by the algorithm in the means 401 as indicated in 001 in FIG. 12, it is possible to learn the distortion characteristics as learnable parameters which include the statistical information such as means and variance.

In addition, the third example embodiment is configured in such a manner that the component of the distortion can be trimmed according to the distribution identified by the means 402 as in 002 in FIG. 12 with feedback from the means 403. In other words, the signal trim means 402 utilize at least one feedback indicating an accuracy of the learnt function from the compensation means 403 to adaptively adjust output of the signal trim means. This enables the pre-compensation means 403 to be more accurate in modelling and require less data to converge with enhanced accuracy.

Fourth Example Embodiment

<Explanation of Structure>

Figure 10:
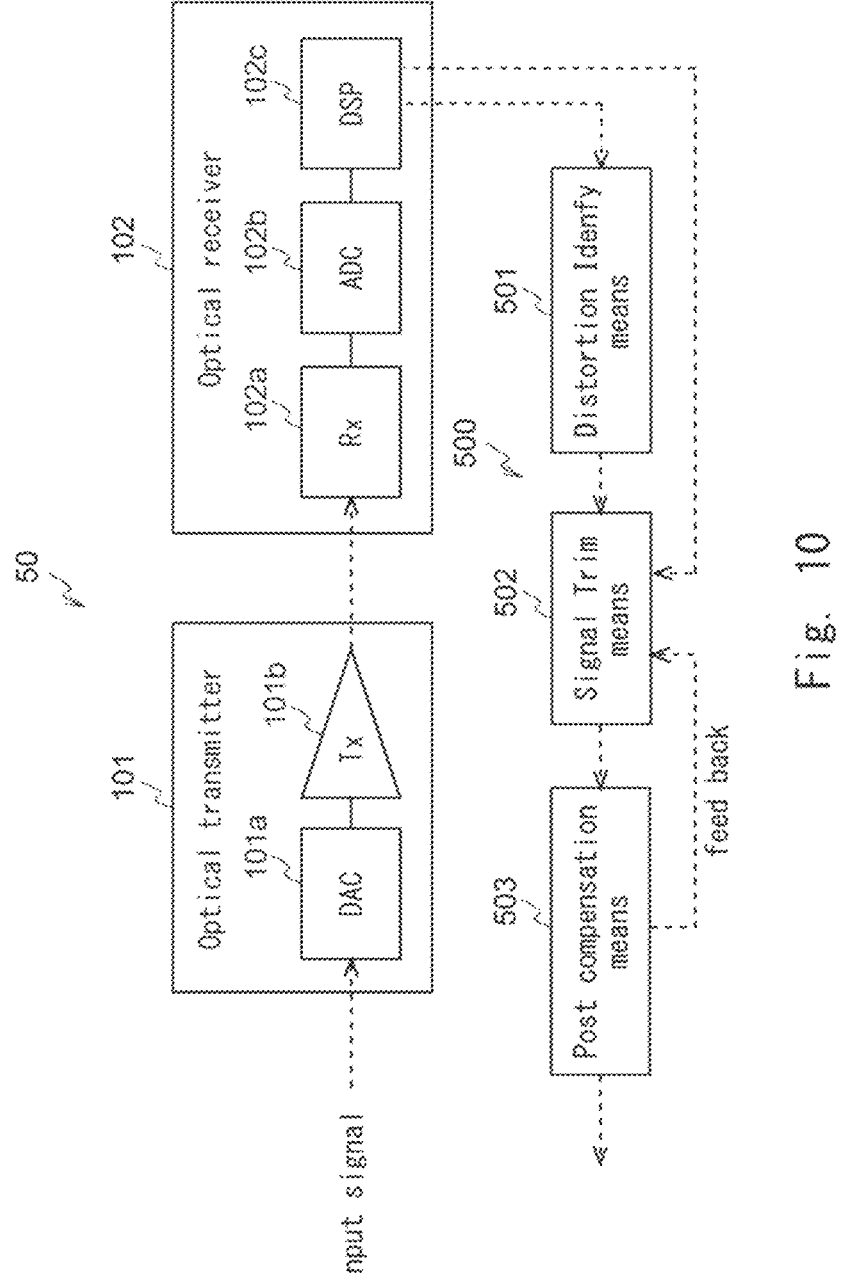
FIG. 10 is a diagram illustrating a fourth example embodiment with post compensation implemented along with our proposed method.

Next, a fourth example embodiment is elaborated referring to the accompanying drawings. Referring to FIG. 10, an optical communication system according to the fourth example embodiment is described. The fourth example embodiment illustrating an implementation which is identical to the second example embodiment in every respect except for a post compensation means 503.

A distortion identify means 501 presented in this embodiment is identical to the means 301 while a signal trim means 502 in identical to the means 302 except for an additional input (feedback) from the means 503 which is used to set the confidence interval "T". The distortion identify means 501 and the signal trim means 502 correspond to a de-noising system 500.

The means 503 is a similar means as the means 303 with an additional output indicating the degree of accuracy of fit achieved. The feedback may correspond to the loss function output from the means 503 which could be a loss function. This feedback is used to adjust the means 502 parameters such as confidence interval "T".

<Description of Operation>

At least a program according to the fourth example embodiment is loaded onto at least a computer to control the operation of the computer. The computer may include various IC such as CPU, processor, data processing device, FPGA, and ASIC. Under the control of the program, the computer performs the following processes, which are identical to those processes which are performed by the computers of the second example embodiment.

Figure 11:
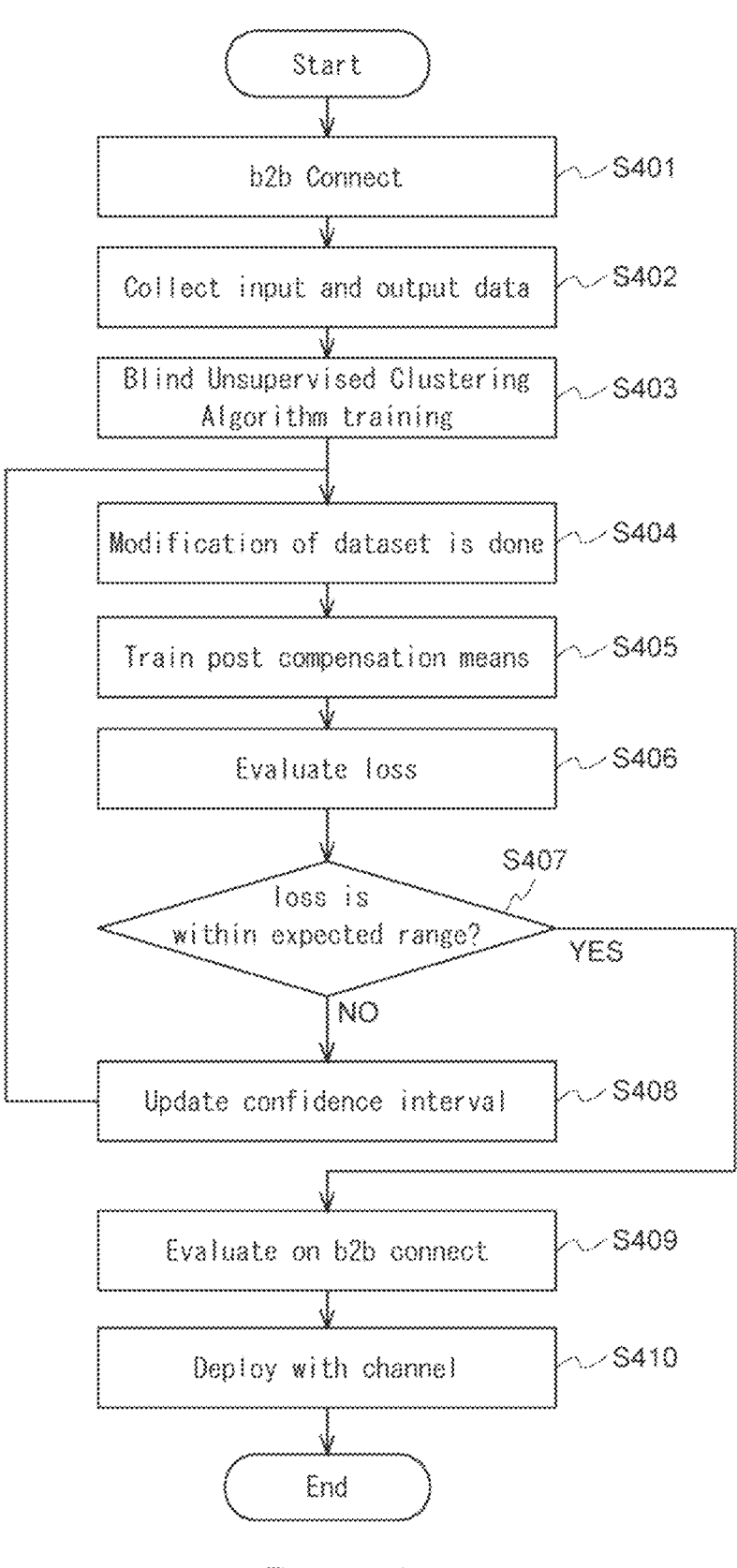
FIG. 11 is a flow diagram illustrating the flow of the operation of the fourth example embodiment.

Next, referring to a flowchart in FIG. 11, the general operation of the fourth example embodiment is elaborated.

First, in step S401 in FIG. 11, back to back (b2b) connect is established, that is optical setup is run without any compensation in a back to back setup. In this step, the input transmit symbols are passed through the optical transmitter 101 and the optical receiver 102 and received symbol is the output from the optical receiver 102. Then, in step S402 the output data is collected.

Further, in step S403, Blind Unsupervised Clustering Algorithm training is done, that is the means 501 which may implement an Unsupervised Clustering Algorithm as described before as unsupervised learning algorithm is run on the collected output data in step S402.

In step S404, modification of dataset (i.e. signals) for confidence region Ti is done. In this step, learned parameters from the means 501 is utilized by the means 502 along with the received signal output in order to de-noise the signal.

In step S405, training of the means 303 is done. In this step, this modified signal is passed onto the post compensation means 503 where training is done along with the ground truth.

After convergence of training the evaluation of loss from the ground truth is done in step S406.

Based on the loss from step S406, the next step is decided. In step S407, it is determined whether the loss is within the expected range. The step S407 may be done by a loss determining means in the de-noising system 500. The loss determining means can be embodied by at least a computer with at least a program. This expected range correspond to acceptable range of the loss. If the loss is not within the expected range (NO), then the confidence interval "T" used in the means 502 is updated based on feedback from the means 503 in step S408. The step S408 may be done by an update means in the de-noising system 500. The update means can be embodied by at least a computer with at least a program. And this process returns to step S404. In case the loss is within the expected range (YES), the process proceeds to step S409 where the means 503 is implemented first in the b2b setup.

In step S410, in presence of the optical channel which is connected in between the optical transmitter 101 and the optical receiver 102 deployment with the channel is done.
<Description of Effect>
Next, the effect of the fourth example embodiment is described with aid from the illustration in FIG. 12 indicating the proposed processing for QPSK signals.

As the fourth example embodiment is configured in such a manner that distortion characteristics is learned by the algorithm in the means 501 as indicated in 001 in FIG. 12, it is possible to learn the distortion characteristics as learnable parameters corresponding to the statistical information which may include mean and divergence from mean.

In addition, the fourth example embodiment is configured in such a manner that the component of the distortion can be trimmed according to the distribution identified by the means 502 as in 002 in FIG. 12 so that the statistical information of the signal is changed. This enables the post compensation means 503 to be more accurate in modelling and require less data to converge. Along with the feedback from the means 503, the correct statistical information is utilized to adapt the signal so that accurate fitting of the post compensation means 503 is achieved.

EXAMPLE

Next, the operation of a mode for carrying out the present disclosure is described by way of a concrete example which elaborates the third example embodiment.

As illustrated in FIG. 8, a pre-compensation means 403 is connected to the optical transmitter 101 with the objective of mitigating distortions preliminary.

First, the optical transmitter 101 and the optical receiver 102 are connected in a back to back data connection. In this example an input symbols belonging to the 16-QAM constellation is transmitted. The output from the optical receiver 102 is the signal from the coherent receiver passed through an ADC 102*b* which is further processed by DSP 102*c* having algorithms including filtering, sampling.

The output from the optical receiver 102 is then passed to the means 401. The means 401 is implemented with the assumption that the distortions follow the Gaussian distribution. Therefore, the Unsupervised Clustering Algorithm (UCA) utilized in the means 401 is the Gaussian Mixture model (GMM). The GMM in this case is set to have 16 clusters equal to the constellation order. The GMM utilizes the signal to converge at a solution that includes the coordinates of the 16 cluster centers along with variance around the center in 2-D coordinates. This information can be utilized to estimate the likelihood of a signal belonging to one of the clusters (i.e. 1 of the 16 transmit symbols).

Figures 13, 14:
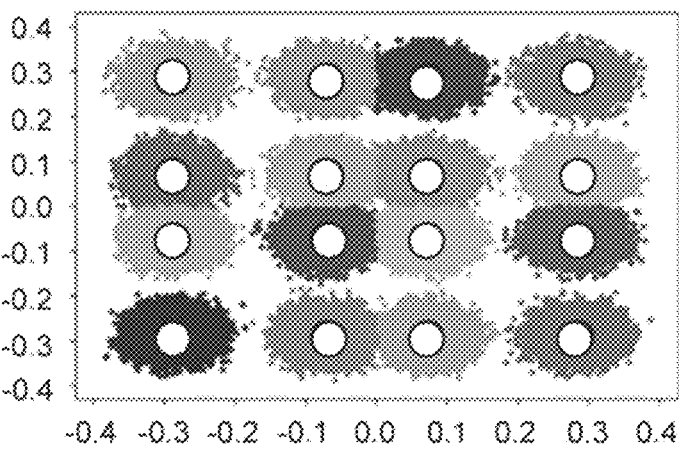
FIG. 13 is a diagram indicating the distortion characteristic learning for a 16QAM optical b2b setup.
FIG. 14 describes an example of pseudo code summarizing the third example embodiment.

In FIG. 13, the clustering of 16-QAM Received constellation from a 32 Gbaud b2b optical setup with significant non-linear distortions is described. The GMM is able to cluster the symbols and also identify the 16 cluster centers accurately. Let the cluster centers be demoted as Ci and the Variance as Vi for the i-th cluster. The signal along with the learned parameters from the GMM are passed on to the means 402. A simple signal trimming with the aid of the GMM parameters is proposed in this example as follows.

<Equation 6>

$$f(x) = \{(x - (C_i + L(V_i, T) + w \cdot (L(V_i, T)) \cdot |x| < \tag{6}$$
$$|L(V_i, T)|w \cdot (x - C_i) \cdot |x| \le |L(V_i, T)|$$

Where w corresponds to a scalar weight, the function L( ) indicates confidence region coordinates for a given variance Vi and confidence threshold T. The function L( ) may be a simple likelihood function for a Gaussian distribution with the input variance and confidence boundary. Ci corresponding to a signal x may be identified by computing the closest center to x or using additional information such as the ground truth (actual transmit symbol for x).

After this modification, the output of the means 402 is to be passed on to the means 403 where this signal data along with input symbol pattern (ground truth) is used to fit an appropriate compensation function. This fitting may be used to learn a FIR filter coefficients, memory or Volterra polynomial coefficients or even a neural network weights.

After this fitting, the loss or inaccuracy of the fit may be evaluated. If the loss is more than an acceptable threshold, the value of the confidence threshold T is modified and the means 402 modify the signal until the loss is within acceptable range.

In FIG. 14, a pseudo code representing the above description is shown with the Digital Pre-distortion (DPD) corresponding to the pre-compensation means. Note that DPD may be replaced with the post compensation means. After the loss is within acceptable range, this fitted function is adopted and implemented in the flow before the Tx means 101*b* so that input pattern is pre-distortion to mitigate the distortion effects accurately. Since the exact function to be learnt is extracted accurately from the available data by de-noising (elimination of noise un-learnable and probabilistic components) using the means 401 and 402, the signal data volume required for function fitting will be significantly less.

All other embodiments similar to the above mention example for the third example embodiment may be implemented.

INDUSTRIAL APPLICABILITY

The present disclosure is applicable to a pre-distortion system for optical transmitter effects. Specifically, a signal modifying program with the objective of removing the noise and other undesired characteristics from the signal. The present disclosure is also applicable to a post compensation system that compensates for the optical transmitter effects. The present disclosure may also be applicable to optical communication with the objective of compensating the optical communication effects in either pre or post mode.

Various other modifications will be apparent to those skilled in the art and will not be described in further detail here. Note that the proposed patent may also be implemented directly on the complete optical communication system with channel instead of initial back to back data connection and training. In other words, the distortion compensation function may use data from the complete optical communication system to learn.

The program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

What is claimed is:

1. A signal processing system comprising:
an optical transmitter configured to input a signal;
an optical receiver configured to input signals;
at least one processor configured to:
    execute a learning algorithm;
    identify a distortion of the input signals from the optical receiver in an unsupervised manner to output distortion parameters indicating the distortion identified;
    utilize the outputted distortion parameters to modify a signal inputted to the optical transmitter with or without the assistance of a ground truth; and
    utilize the modified signal along with the ground truth to train the learning algorithm to learn a function to compensate a distortion of at least one signal inputted.

2. The system according to claim 1, wherein the system is configured to learn the distortion parameters by learning statistical information for probability distributions of the distortion identified.

3. The system according to claim 2, wherein the system is configured to learn the statistical information with learning algorithms.

4. The system according to claim 1, wherein the system is configured to cluster and separate the input signal according to at least one transmit symbol of the input signal.

5. The system according to claim 1, wherein the system is configured to modify the signal based on statistical properties of the signal, the statistical properties include likelihood of the signal.

6. The system according to claim 1, wherein the learned function compensates a distortion of at least one signal inputted to the optical transmitter or a distortion of at least one signal outputted from the optical receiver.

7. The system according to claim 1, wherein the system is configured to utilize at least one feedback indicating an accuracy of the learned function to adaptively adjust output.

8. A de-noising method performed by a computer for an optical communication system including an optical transmitter and an optical receiver, wherein the method comprises:
inputting signals to the optical receiver;
identifying, by at least one processor, a distortion of the input signals from the optical receiver in an unsupervised manner to output distortion parameters indicating the distortion identified;
utilizing, by the at least one processor, the outputted distortion parameters to modify a signal;
inputting the modified signal to the optical transmitter with or without the assistance of a ground truth; and
utilizing, by the at least one processor, the modified signal along with the ground truth to train a learning algorithm executed by the at least on processor to learn a function in order to compensate a distortion of at least one signal inputted.

9. The de-noising method according to claim 8, wherein the learned function compensates a distortion of at least one signal inputted to the optical transmitter or a distortion of at least one signal outputted from the optical receiver.

10. The de-noising method according to claim 8, comprising utilizing at least one feedback indicating an accuracy of the learned function to adaptively adjust output.

11. A non-transitory computer readable medium storing a de-noising program for an optical communication system including an optical transmitter and an optical receiver, wherein the program causes a computer to execute:
inputting signals to the optical receiver;
identifying, by at least one processor, a distortion of the input signals from the optical receiver in an unsupervised manner to output distortion parameters indicating the distortion identified;
utilizing, by the at least one processor, the outputted distortion parameters to modify a signal inputted to the optical transmitter with or without the assistance of a ground truth; and
utilizing, by the at least one processor, the modified signal along with the ground truth to train a learning algorithm executed by the at least one processor to learn a function in order to compensate a distortion of at least one signal inputted.

12. The non-transitory computer readable medium according to claim 11, wherein the learned function compensates a distortion of at least one signal inputted to the optical transmitter or a distortion of at least one signal outputted from the optical receiver.

13. The non-transitory computer readable medium according to claim 11, wherein the program causes a computer to execute utilizing at least one feedback indicating an accuracy of the learned function to adaptively adjust output.

* * * * *